United States Patent
Clingerman et al.

(10) Patent No.: US 7,749,624 B2
(45) Date of Patent: Jul. 6, 2010

(54) METHOD FOR PROVIDING BACK-PRESSURE FOR A FUEL CELL STACK

(75) Inventors: Bruce J. Clingerman, Palmyra, NY (US); John P. Salvador, Penfield, NY (US); Ronald L. James, North Chili, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 663 days.

(21) Appl. No.: 11/750,888

(22) Filed: May 18, 2007

(65) Prior Publication Data

US 2007/0231629 A1 Oct. 4, 2007

Related U.S. Application Data

(62) Division of application No. 10/785,654, filed on Feb. 24, 2004, now Pat. No. 7,235,318.

(51) Int. Cl.
*H01M 8/00* (2006.01)
*H01M 8/04* (2006.01)
*H01M 8/12* (2006.01)
*H01M 2/00* (2006.01)

(52) U.S. Cl. .............................. 429/13; 429/22; 429/24; 429/34

(58) Field of Classification Search .................... 429/22, 429/24, 34, 13
See application file for complete search history.

(56) References Cited

U.S. PATENT DOCUMENTS

2003/0093950 A1* 5/2003 Goebel et al. ............. 48/197 R
2004/0258968 A1* 12/2004 Voss et al. .................... 429/26

* cited by examiner

*Primary Examiner*—Patrick Ryan
*Assistant Examiner*—Karie O'Neill Apicella
(74) *Attorney, Agent, or Firm*—John A. Miller; Miller IP Group, PLC

(57) ABSTRACT

A method for controlling the pressure within a fuel cell stack to control the stack relative humidity. In one embodiment, a two-position valve receiving the cathode exhaust is switchable between a fully open and a fully closed position, where the valve is opened when the fuel cell system is operating at a low operation temperature and the valve is closed when the fuel cell system is operating at a high operation temperature. A fixed restriction valve is provided in parallel with the two-position valve so that when the two-position valve is fully closed, the proper amount of pressure is provided at the cathode output. In another embodiment, the two-position valve employs leak paths so that when the two-position valve is in the closed position, the cathode exhaust gas can still flow through.

18 Claims, 3 Drawing Sheets

METHOD FOR PROVIDING BACK-PRESSURE FOR A FUEL CELL STACK

CROSS-REFERENCE TO RELATED APPLICATIONS

This application is a Divisional application of U.S. Patent application Ser. No. 10/785,654, filed Feb. 24, 2004 now U.S. Pat. No. 7,235,318 and titled "Fuel Cell System Back-Pressure Control with a Discrete Valve."

BACKGROUND OF THE INVENTION

1. Field of the Invention

This invention relates generally to a method for controlling the relative humidity in a fuel cell stack and, more particularly, to a method for controlling the relative humidity in a fuel cell stack by selectively opening and closing a discrete two-position valve at the cathode exhaust of the stack to control stack pressure.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The humidity or wetness of the membranes in a fuel cell stack is an important design criteria for effective stack operation. Too much water within the stack acts to prevent the oxygen in the cathode input gas from reaching the catalyst on the cathodes. Too little water within the stack causes the stack membranes to dry out and become more susceptible to cracking and other damage. The more current that the stack generates, the more water is generated as a by-product of the electrochemical process. However, the more air that is forced through the stack by the compressor to provide more current, the more the stack membranes dry out. Typically, the stack has a 110% relative humidity during its most efficient operation. For 110% relative humidity, the exhaust gas is saturated 100%, and also includes a little bit of excess water.

Another factor that affects the stack relative humidity is stack temperature. As the stack temperature increases, the stack's ability to hold water in the vapor state also increases making it more difficult to maintain a desired stack relative humidity because more water is required to do so. Another factor that affects stack relative humidity is the stack pressure. As the pressure in the stack increases, the ability of the stack to hold water in the vapor state decreases. Thus, one of the most commonly used techniques to control cathode relative humidity is to control the fuel cell system pressure and temperature.

Fuel cell systems must reject waste heat. A fuel cell system will include a thermal coolant sub-system that removes heat from the stack so that it operates at its desired operating temperature. The heated coolant from the stack is directed to a radiator that reduces the temperature of the coolant so that it can be returned to the stack to remove the stack waste heat. The size of the radiator limits how much heat can be removed from the coolant.

The amount of waste heat that the coolant sub-system can reject is directly proportional to the operating temperature of the fuel cell system. If the system is able to operate at a higher temperature, a smaller radiator can be employed to remove the heat, thus conserving space. Unfortunately, a higher operating temperature requires a higher system pressure to keep the stack relative humidity at the desired level. In other words, as the temperature of the stack rises, its ability to hold water increases, thus requiring more water to meet the desired relative humidity. The higher pressure cancels the effect of the higher temperature on relative humidity. At higher operating temperatures, however, the stack may not produce enough water to meet the required relative humidity.

Because the size of the radiator is limited in a vehicle, a fuel cell system typically must operate at higher temperatures. Therefore, it becomes necessary to increase the pressure of the fuel cell stack so that more water is held therein to meet the desired relative humidity. However, high cathode pressures require larger amounts of compressor power, which results in a reduction in system efficiency.

Two approaches are known in the art to control fuel cell system pressure. One known approach is to employ a fixed orifice at the cathode exhaust output. Particularly, for high temperature applications the cathode output orifice is sized to provide a sufficient back-pressure to meet the relative humidity requirements at a maximum system temperature. However, the output orifice also causes high system pressure at low output power, and thus, the fuel cell system efficiency will suffer because of the higher compressor parasitic power.

For low temperature applications, where the thermal sub-system size is not critical, the cathode output orifice is sized to provide a nearly zero pressure drop. This allows the fuel cell system to run with low compressor parasitic losses, and is therefore efficient over the entire operating range. However, this fuel cell system will be large as a result of the large radiator required to reject the low-grade heat.

Modeling results have shown that a fixed orifice is capable of reducing the flow and pressure of the cathode exhaust gas without overloading the thermal sub-system. As a fuel cell power module decreases in flow and power, the amount of the waste heat the radiator has to dissipate will decrease. The amount of waste heat a radiator can dissipate is proportional to the temperature difference between the coolant and the ambient air. This value is often represented by Q/ITD, where Q is the waste heat and ITD is the initial temperature difference between the coolant and the air. Radiators are sized for a maximum Q/ITD at maximum power. Therefore, as the fuel cell turns down in flow and power, the waste heat requirement is lowered, which allows the operating temperature to be lowered. This allows the operating pressure to be lowered.

FIG. 1 is a graph with cathode input air flow on the horizontal axis and the required compressor pressure on the vertical axis showing the possible compressor delivery pressure for a fuel cell system employing only a fixed orifice to control system pressure. Graph line 40 shows the operation curve of the system for flow versus pressure for a high pressure drop at the fixed orifice, and graph line 42 shows the operation curve for flow versus pressure for a near zero pressure drop at the fixed output orifice. The fuel cell system will operate on one of the graph lines 40 or 42, regardless of the system operating temperature. The high pressure graph line 40 wastes energy at part power conditions, and the low pressure graph line 42 can only meet humidity requirements at low temperatures.

Another known approach is to use active cathode pressure control. This has been done in the past with high-resolution control valves. These high-resolution control valves offer many discrete valve open positions or an analog control where fluid flow through the valve can be set at any desirable location. The position of the valve is determined by the current operating temperature of the system and the amount of water that is being generated by the stack to provide a calculation of what pressure is necessary to provide a 110% stack relative humidity. Further, it is necessary to provide a safety device that prevents the valve from failing in the closed position, which could cause catastrophic stack failure from high pressure. While this approach offers a good solution that attempts to optimize system efficiency over its entire operating range, the control valve and support software are high cost components. Further, in the majority of the operating conditions of a fuel cell system, this level of control is unnecessary.

FIG. 2 is a graph with cathode input air flow on the horizontal axis and the required compressor pressure on the vertical axis showing the possible compressor delivery pressures for a fuel cell system employing a high resolution back-pressure valve. Graph line 44 shows how the cathode pressure can be directly controlled independent of flow to provide the desired relative humidity. At a constant low temperature operation, the control valve is wide open so that the pressure drop at the cathode exhaust is near zero. As the flow increases, the system temperature increases, and the valve will be systematically closed to provide the desired fuel cell back-pressure to control the relative humidity.

For fuel cell systems having a high resolution back-pressure control valve, the valve position is changed as a function of coolant temperature in order to maintain the desired relative humidity. However, the pressure drop across a fixed orifice is a function of the fluid velocity, fluid viscosity and orifice shape. Because the orifice shape cannot be changed, the cathode pressure and flow rate cannot be independently controlled. If the fixed orifice is sized to meet the humidity requirements at the maximum temperature, maximum flow and maximum Q/ITD point, it will provide sufficient humidity control in turn down. The minimum pressure required to maintain the desired humidity is given by operating at the minimum temperature possible, while maintaining a maximum Q/ITD condition in turn down. This required pressure is less than the pressure provided by the pressure drop across a fixed orifice in turn down when sized at the maximum point.

A system model was constructed where the maximum allowable Q/ITD was set at maximum power and flow. As the module turned down in flow and power, the coolant temperature was lowered only as much as possible without exceeding the maximum Q/ITD. The system back-pressure requirement was then calculated in order to meet the required humidity level. This gives a flow versus pressure drop curve that is required of the back-pressure valve in order not to exceed the maximum Q/ITD limit. FIG. 3 is a graph with cathode input air flow on the horizontal axis and back-pressure valve pressure drop on the vertical axis, where graph line 46 shows this relationship.

The model was re-run using a fixed area orifice for back-pressure control. The orifice was modeled based on a sharp edge orifice that was sized to meet the desired humidity at the maximum flow and temperature condition. The pressure drop through a sharp edge orifice is proportional to the square of the fluid velocity. Under this assumption, a flow versus pressure drop curve was generated for the system using the fixed area orifice, as shown by graph line 48 in FIG. 3. This modeling shows that the pressure drop for the fixed area orifice meets or exceeds the pressure drop requirements to achieve the desired humidity at steady state turn down points. The fixed area orifice will cause the fuel cell to be slightly over pressurized at part power conditions, which will give a slightly higher than optimal humidity. This will cause a slight system efficiency hit, but is not damaging to stack durability. If the fixed orifice pressure drop was less than the pressure drop required to meet the Q/ITD limit, then the humidity would be lower than desired and the stack may be damaged.

SUMMARY OF THE INVENTION

In accordance with the teachings of the present invention, a method is disclosed for controlling the back pressure of a fuel cell stack that uses a discrete two-position valve at the cathode exhaust gas output. In one embodiment, the discrete valve is switchable between a fully open and a fully closed position, where the fully open position is used when the fuel cell system is operating at a low operation temperature and the fully closed position is used when the fuel cell stack is operating at a high operation temperature. A fixed restriction valve is provided in parallel with the discrete valve so that when the discrete valve is closed, the proper amount of back-pressure is provided at the cathode output to meet the relative humidity requirements.

In another embodiment, the discrete two-position valve employs sized leak paths so that when the discrete valve is in the closed position, some of the cathode exhaust gas can still flow through under high pressure. In this embodiment, the fixed restriction valve is not necessary.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for controlling the relative humidity in a fuel cell stack using a discrete two-position cathode exhaust gas valve is merely exemplary in nature, and is in no way intended to limit the invention or its applications or uses.

Figure 1:
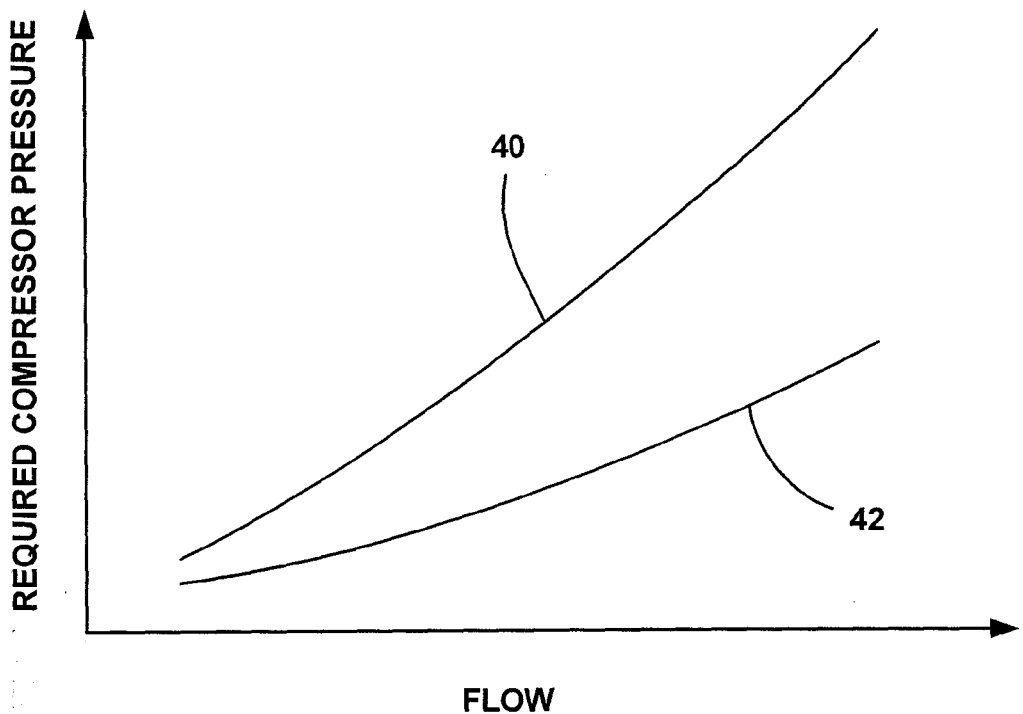
FIG. 1 is a graph with cathode input air flow on the horizontal axis and compressor pressure on the vertical axis showing the flow and pressure relationship for a fuel cell system employing passive back-pressure control using two different fixed orifices.
Figure 2:
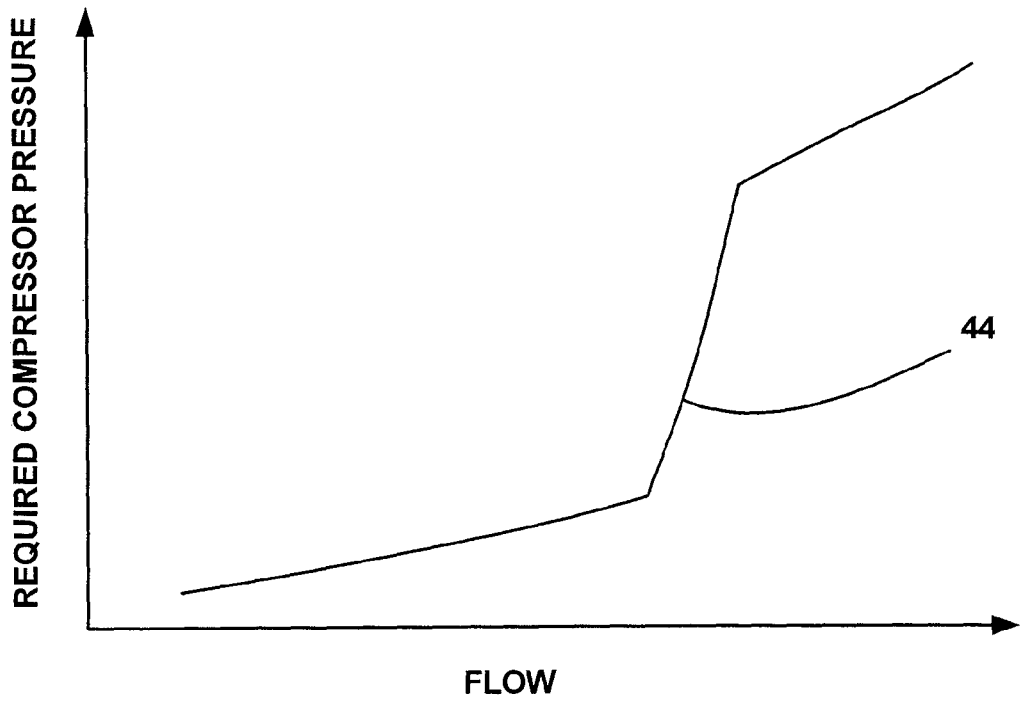
FIG. 2 is a graph with cathode input air flow on the horizontal axis and compressor pressure on the vertical axis showing the flow and pressure relationship for a fuel cell system employing active back-pressure control using a high resolution control valve.
Figure 3:
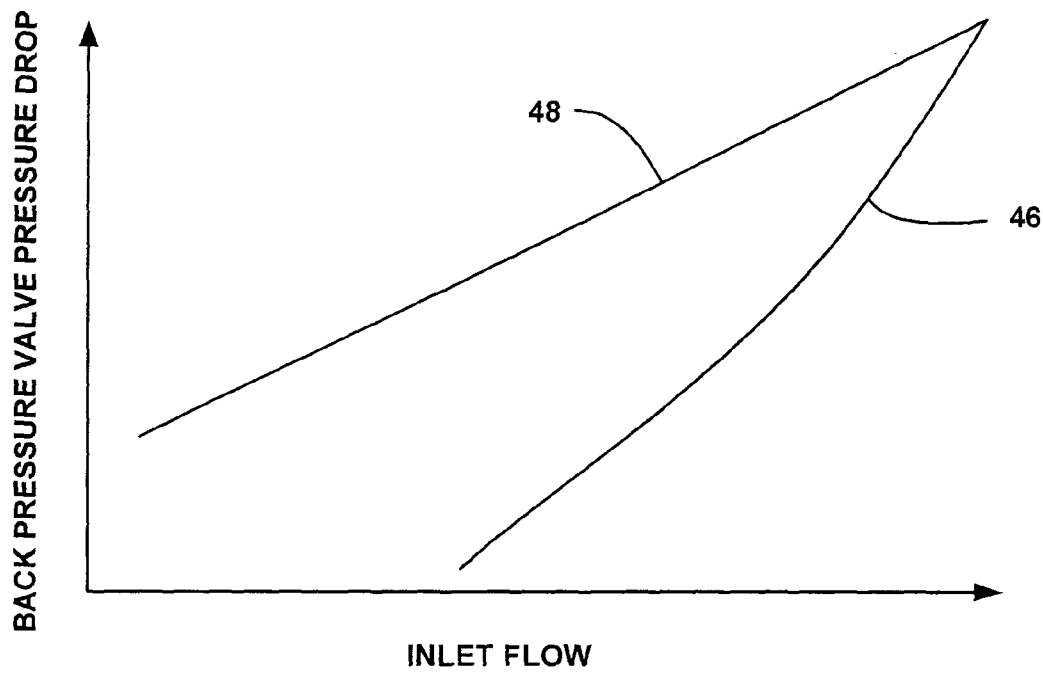
FIG. 3 is a graph with cathode input air flow on the horizontal axis and back-pressure valve pressure drop on the vertical axis for a sharp edge fixed area orifice valve and a constant Q/ITD high resolution back-pressure valve.
Figure 4:
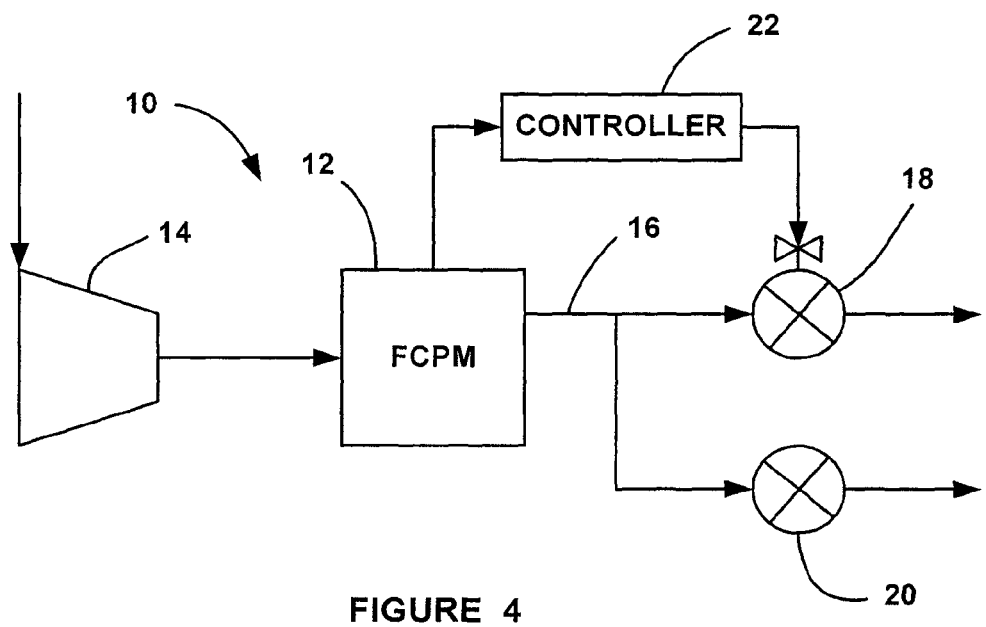
FIG. 4 is a block diagram of a fuel cell system employing a discrete two-position valve in parallel with a fixed orifice valve for controlling cathode exhaust gas pressure and stack relative humidity, according to an embodiment of the present invention.

FIG. 4 is a block diagram of a fuel cell system 10 employing a fuel cell power module (FCPM) 12 including a fuel cell stack, according to an embodiment of the present invention. The system 10 includes a compressor 14 that receives an inlet air flow, and compresses the air to a pressure suitable to drive the appropriate amount of air through the FCPM 12 to meet the power output of the system 10. The FCPM 12 can be any suitable FCPM for a fuel cell system as discussed herein, and its description is not necessary for a proper understanding of the invention.

The FCPM 12 outputs a cathode exhaust gas on an output line 16. The cathode exhaust gas is applied to a discrete two-position valve 18 and a fixed valve 20 that are in parallel. When the discrete valve 18 is open, the pressure drop at the cathode exhaust gas output will be as low as possible for the system 10, where the exhaust gas can flow through both the valves 18 and 20. When the valve 18 is closed, a greater pressure drop will occur across the orifice of the fixed valve 20. The orifice in the fixed valve 20 is sized for the maximum required pressure drop at maximum flow and operating temperature so that the system pressure will allow the system 10 to meet the necessary relative humidity requirements at high temperature operation. A controller 22 provides a control signal to open or close the valve 18 at the appropriate time depending on system parameters, including system operating temperature.

As discussed herein, the discrete valve 18 is a two-position valve. In one embodiment, one position is a fully open position and the other position is a fully closed position. In another embodiment, one position is a fully open position and the other position is a mostly closed position providing a minimal flow therethrough. However, the discrete valve 18 is not a sophisticated, multi-positional control valve as was used in the prior art that has many valve positions between the fully open position and the fully closed position.

The majority of time, the fuel cell system 10 will operate at low temperature, and therefore will require low back-pressure. In this mode, the discrete valve 18 will be in the open position. As the system load increases, thermal management sub-systems (system coolant) will become saturated with low-grade waste heat. The fuel cell system 10 will be able to reject the required amount of waste heat through the thermal sub-system at the low operating temperature. Once the fuel cell stack saturates the thermal sub-system, the temperature of the fuel cell stack will rise. When the system temperature rises above the point where the desired stack relative humidity can no longer be achieved without using system back-pressure, the controller 22 closes the discrete valve 18. This will force the cathode exhaust gas through the fixed valve 20, causing the fuel cell pressure to rise to a level where it will meet the relative humidity requirements.

Figure 5:
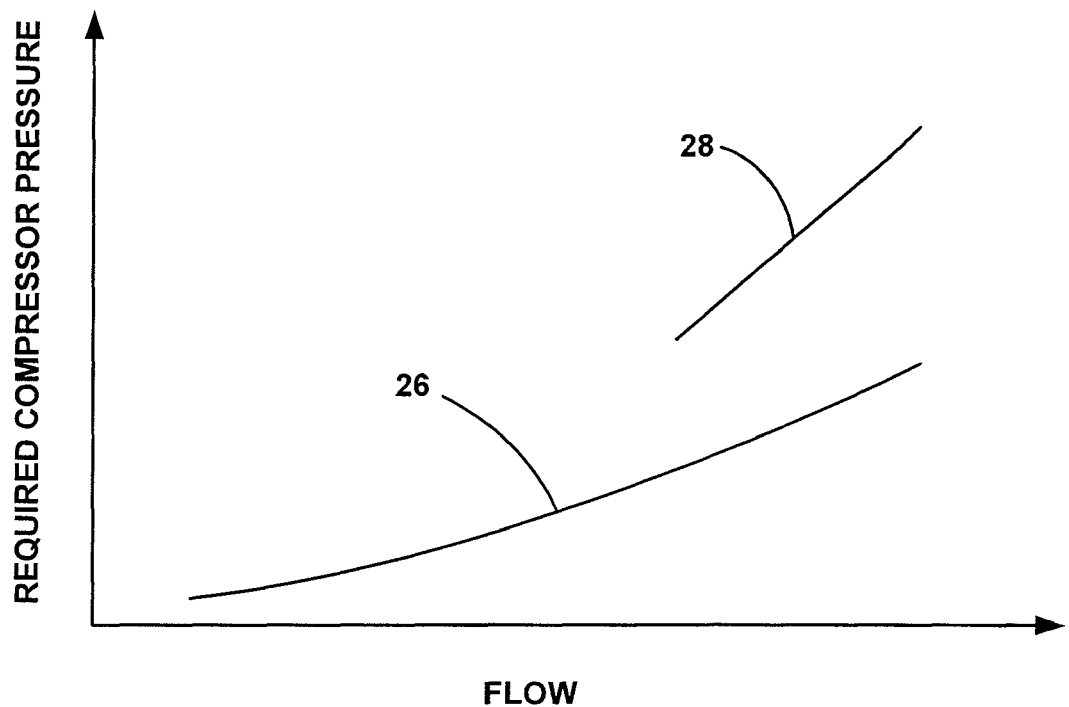
FIG. 5 is a graph with cathode input air flow on the horizontal axis and compressor pressure on the vertical axis showing the flow and pressure relationship for the fuel cell system shown in FIG. 4.

FIG. 5 is a graph with cathode input air flow on the horizontal axis and required compressor pressure on the vertical axis showing control curves for both the discrete valve 18 and the fixed valve 20. Particularly, when the system 10 is operating at low temperature and the valve 18 is open, the compressor pressure will follow graph line 26 as the current output increases. In this low-temperature mode, the operating temperature of the system 10 will eventually reach a temperature where the radiator can no longer remove the waste heat so that the system operates at the desired temperature. At that time, the controller 22 will close the discrete valve 18, and the system 10 will switch to the high-temperature mode where the pressure is increased to provide the desired relative humidity at the higher operating temperature, as represented by graph line 28.

The controller 22 includes suitable software that prevents the discrete valve 18 from cycling in an unstable manner when the system 10 reaches the temperature that will cause the valve 18 to close. Particularly, when the controller 22 provides a valve control signal to switch the valve 18, the controller 22 will wait at least some predetermined period of time to allow the system to stabilize before switching the valve 18 to the previous valve position. The switch point for the valve 18 should have this small hysteresis built into the control. For example, if the thermal sub-system limit is determined by the speed of the radiator fan, then the valve 18 can close at 98% of full rated fan speed. The valve 18 could open based on 95% of the full rated fan speed. This prevents the valve 18 from opening and shutting rapidly while the system 10 sits at the transition point.

Figure 6:
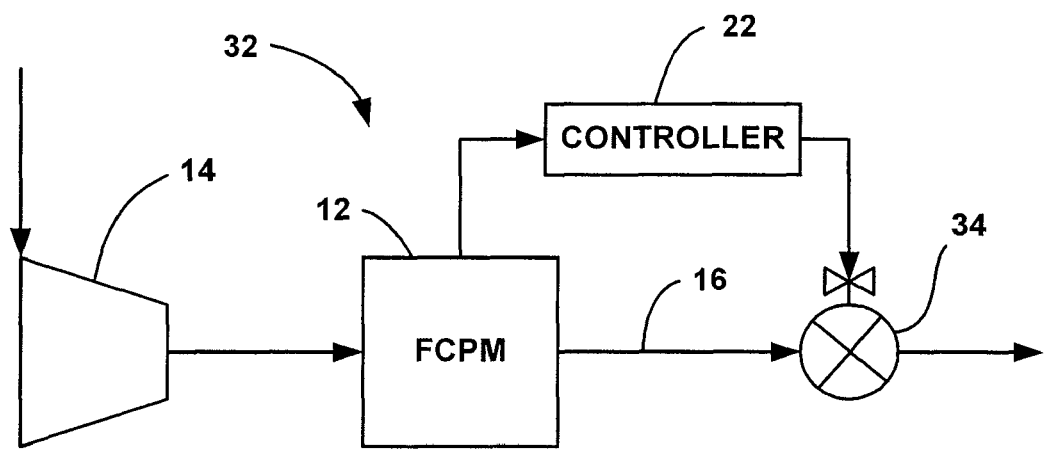
FIG. 6 is a block diagram of a fuel cell system employing a discrete two-position valve including leak paths for controlling the cathode exhaust gas pressure and stack relative humidity, according to another embodiment of the present invention.

FIG. 6 is a block diagram of a fuel cell system 32 similar to the fuel cell system 10 discussed above, where like elements are identified by the same reference number, according to another embodiment of the present invention. In this embodiment, the valves 18 and 20 have been replaced by a single valve 34 that also is a discrete two-position valve, but provides flow in the closed or high-pressure position. When the controller 22 senses that the operating temperature of the FCPM 12 is at a predetermined temperature, and the pressure of the FCPM 12 must be raised to satisfy the desired relative humidity, the controller 22 provides a signal to close the valve 34. However, the valve 34 still includes specifically sized flow-through orifices or leak paths that allows the cathode exhaust gas to flow therethrough under high-pressure in the same manner as the fixed valve 20.

Because the electrodes in the fuel cell stack of the FCPM 12 do not like abrupt pressure changes, the valves 18 and 34 are opened and closed slowly by the controller 22 to prevent quick pressure changes within the FCPM 12. If the valves 18 and 34 move too rapidly, the disturbance to the system 10 may cause air control errors or high delta pressures between the cathode and anode sides of the stack membrane. A valve with a 500 ms transition time makes the system control more accurate. The valves 18 and 34 could include a dash-pot that is mechanically built into the valve 18 or 34, or the transition could be performed electrically. If electrical, the solenoid of the valves 18 or 34 could be made with a high inductance, slowing the valve down when the controller's discrete output driver switches. This also helps reduce the electromagnetic compatibility of the systems 10 and 32 by lowering di/dt.

The use of the two-position valves 18 and 34 has significant advantages over the high-resolution valves employed in the prior art. Particularly, a discrete solenoid valve costs considerably less than an analog valve; a discrete output driver costs considerable less than an analog driver; a discrete valve eliminates the need for a positioned feedback on the valve; a discrete valve requires lower machine tolerances, making it cheaper to manufacture; and a discrete valve eliminates the need for a stack output cathode pressure sensor.

The use of the discrete valves 18 and 34 also provides improved performance over the active back-pressure systems. Particularly, the discrete system has reduced actuator power requirements because the valve no longer needs to fail in the open position. Because fuel cells must vent to atmosphere at shut down, the valves 18 and 34 can fail in the closed position and still vent the system. Further, the discrete system has more designed flexibility because it doesn't necessarily require a fail open spring. Also, the discrete system may have more tolerance to freezing because the valve doesn't need a completely closed seal that can get stuck shut from icing.

The present invention also has a lower system cost relative to a fuel cell system having a back-pressure orifice. Particularly, the present invention provides reduced compressor motor power, therefore reducing the motor and controller size and cost.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the relative humidity in a fuel cell stack, said method comprising:
    applying a compressed air flow to a cathode input of the fuel cell stack; and
    controlling the pressure within the fuel cell stack by controlling the back-pressure of a cathode exhaust gas flow from the fuel cell stack, wherein controlling the pressure within the fuel cell stack includes directing the exhaust gas flow through a two-position valve having a first position for providing a low back-pressure if the operating temperature of the stack is below a predetermined temperature and a second position providing a high back-pressure if the operating temperature of the stack rises above the predetermined temperature.

2. The method according to claim 1 wherein controlling the pressure within the fuel cell stack further includes providing a fixed restriction valve in parallel with the two-position valve so that the fixed restriction valve provides the high back-pressure when the two-position valve is in the second position.

3. The method according to claim 1 wherein controlling the pressure within the fuel cell stack includes providing leak paths in the two-position valve to provide the high back-pressure when the two-position valve is in the second position.

4. The method according to claim 1 wherein controlling the pressure within the fuel cell stack includes preventing rapid switching of the two-position valve between the first position and the second position.

5. The method according to claim 1 wherein the two-position valve has a relatively slow transition time so as to prevent rapid changes between the open and closed position.

6. The method according to claim 5 wherein the two-position valve has about a 500 ms transition time.

7. The method according to claim 5 wherein the slow transition time is provided by one of a mechanical dash-pot or electrical control.

8. The method according to claim 1 wherein the fuel cell stack is on a vehicle.

9. A method for controlling the relative humidity in a fuel cell stack, said method comprising:
    applying a compressed air flow to a cathode input of the fuel cell stack; and
    controlling the pressure within the fuel cell stack by controlling the back-pressure of a cathode exhaust gas flow from the fuel cell stack, wherein controlling the pressure within the fuel cell stack includes directing the exhaust gas flow through a two-position valve having a first position for providing a low back-pressure if the operating temperature of the system is below a predetermined temperature and a second position providing a high back-pressure if the operating temperature of the stack rises above the predetermined temperature, and wherein a fixed restriction valve in parallel with the two-position valve provides the high back-pressure when the two-position valve is in the second position.

10. The method according to claim 9 wherein controlling the pressure within the fuel cell stack includes preventing rapid switching of the two-position valve between the first position and the second position.

11. The method according to claim 9 wherein the two-position valve has a relatively slow transition time so as to prevent rapid changes between the open and closed position.

12. The method according to claim 11 wherein the two-position valve has about a 500 ms transition time.

13. The method according to claim 11 wherein the slow transition time is provided by one of a mechanical dash-pot or electrical control.

14. A method for controlling the relative humidity in a fuel cell stack, said method comprising:
    applying a compressed air flow to a cathode input of a fuel cell stack; and
    controlling the pressure within the fuel cell stack by controlling the back-pressure of a cathode exhaust gas flow from the fuel cell stack, wherein controlling the pressure within the fuel cell stack includes directing the exhaust gas flow through a two-position valve having a first position for providing a low back-pressure if the operating temperature of the stack is below a predetermined temperature and a second position providing a high back-pressure if the operating temperature of the stack rises above the predetermined temperature, and wherein the two-position valve includes leak paths that provide the high back-pressure when the two-position valve is in the second position.

15. The method according to claim 14 wherein controlling the pressure within the fuel cell stack includes preventing rapid switching of the two-position valve between the first position and the second position.

16. The method according to claim 14 wherein the two-position valve has a relatively slow transition time so as to prevent rapid changes between the open and closed position.

17. The method according to claim 16 wherein the two-position valve has about a 500 ms transition time.

18. The method according to claim 16 wherein the slow transition time is provided by one of a mechanical dash-pot or electrical control.

* * * * *